United States Patent
Gritzman et al.

(10) Patent No.: US 10,768,780 B2
(45) Date of Patent: Sep. 8, 2020

(54) METHOD AND SYSTEM FOR CONTEXT-DRIVEN DISPLAYING OF SHORTCUTS ON TOUCHSCREEN

(71) Applicant: International Business Machines Corporation, Armonk, NY (US)

(72) Inventors: Ashley D Gritzman, Johannesburg (ZA); Abdigani M Diriye, Nairobi (KE); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 15/836,932

(22) Filed: Dec. 11, 2017

(65) Prior Publication Data

US 2019/0179513 A1 Jun. 13, 2019

(51) Int. Cl.
| | |
|---|---|
| *G06F 3/0481* | (2013.01) |
| *G06F 3/0488* | (2013.01) |
| *G06F 3/0482* | (2013.01) |
| *G06F 3/0484* | (2013.01) |
| *G10L 15/22* | (2006.01) |
| *G06F 17/00* | (2019.01) |

(52) U.S. Cl.
CPC ........ *G06F 3/04817* (2013.01); *G06F 3/0488* (2013.01); *G06F 3/0482* (2013.01); *G06F 3/04847* (2013.01); *G06F 3/04883* (2013.01); *G10L 15/22* (2013.01)

(58) Field of Classification Search
CPC .. G06F 3/0482; G06F 3/04817; G06F 3/0488; G06F 3/04883; G06F 3/04847; G10L 15/22
See application file for complete search history.

(56) References Cited

U.S. PATENT DOCUMENTS

| | | | |
|---|---|---|---|
| 7,310,636 B2 | 12/2007 | Bodin et al. | |
| 2003/0084059 A1* | 5/2003 | Kelley | .............. G06Q 40/06 |
| 2006/0284853 A1 | 12/2006 | Shapiro | |
| 2007/0126714 A1 | 6/2007 | Imamura | |
| 2010/0083190 A1 | 4/2010 | Roberts et al. | |

(Continued)

FOREIGN PATENT DOCUMENTS

WO 2014172148 A2 10/2014

*Primary Examiner* — Quoc A Tran
(74) *Attorney, Agent, or Firm* — Scully, Scott, Murphy & Presser, P.C.; Shimon Benjamin

(57) ABSTRACT

A computer-implemented method of controlling a computer system is provided. In particular, the method relates to controlling of a touchscreen of the computer system in order to display contextually relevant user interface objects on a graphical display of the touchscreen. The computer system includes a processor and the touchscreen includes a touch sensor as an input device. The method includes determining, by way of a user context determination module, a user context of at least one user of the computer system, selecting, using an icon selection module, one or more user interface objects which are contextually relevant to the determined context of the user, and displaying, using the graphical display of the touchscreen, the one or more user interface objects selected by the icon selection module. Determining the user's context may include monitoring the user's behavior, mood or cognitive state.

20 Claims, 8 Drawing Sheets

(56) References Cited

U.S. PATENT DOCUMENTS

| | | |
|---|---|---|
| 2010/0275163 A1 | 10/2010 | Gillespie et al. |
| 2011/0212717 A1* | 9/2011 | Rhoads .............. G06K 9/00664 |
| | | 455/420 |
| 2011/0221678 A1 | 9/2011 | Davydov |
| 2012/0235921 A1 | 9/2012 | Laubach |
| 2012/0242581 A1 | 9/2012 | Laubach |
| 2013/0278492 A1* | 10/2013 | Stolarz ...................... G06F 3/01 |
| | | 345/156 |
| 2014/0068674 A1 | 3/2014 | Sirpal et al. |
| 2014/0289659 A1 | 9/2014 | Harrison et al. |
| 2015/0067495 A1 | 3/2015 | Bernstein et al. |
| 2015/0370339 A1 | 12/2015 | Ligtenberg et al. |
| 2016/0117084 A1 | 4/2016 | Ording |
| 2017/0041687 A1* | 2/2017 | Narasipuram ..... H04N 21/8545 |

\* cited by examiner

METHOD AND SYSTEM FOR CONTEXT-DRIVEN DISPLAYING OF SHORTCUTS ON TOUCHSCREEN

BACKGROUND

The present invention relates to computer interface devices. More specifically, an embodiment of the invention relates to a touchscreen having both input and output capabilities and to a method of controlling what is output on the touchscreen.

SUMMARY

According to an embodiment of the present invention, there is provided a computer-implemented method of controlling a computer system which includes a processor and a touchscreen, the touchscreen including a graphical display and a touch sensor, the method including:
  determining, by way of a user context determination module, a user context of at least one user of the computer system;
  selecting, using an icon selection module, one or more user interface objects which are contextually relevant to the determined context of the user; and
  displaying, using the graphical display of the touchscreen, the one or more user interface objects selected by the icon selection module.

Embodiments of the present invention extend to a corresponding computer system and a computer program product.

DETAILED DESCRIPTION

Examples and aspects are discussed below with reference to the FIGS. However, it should be understood that the detailed description given with respect to these FIGS is for explanatory purposes only, and not by way of limitation.

Figure 1A:
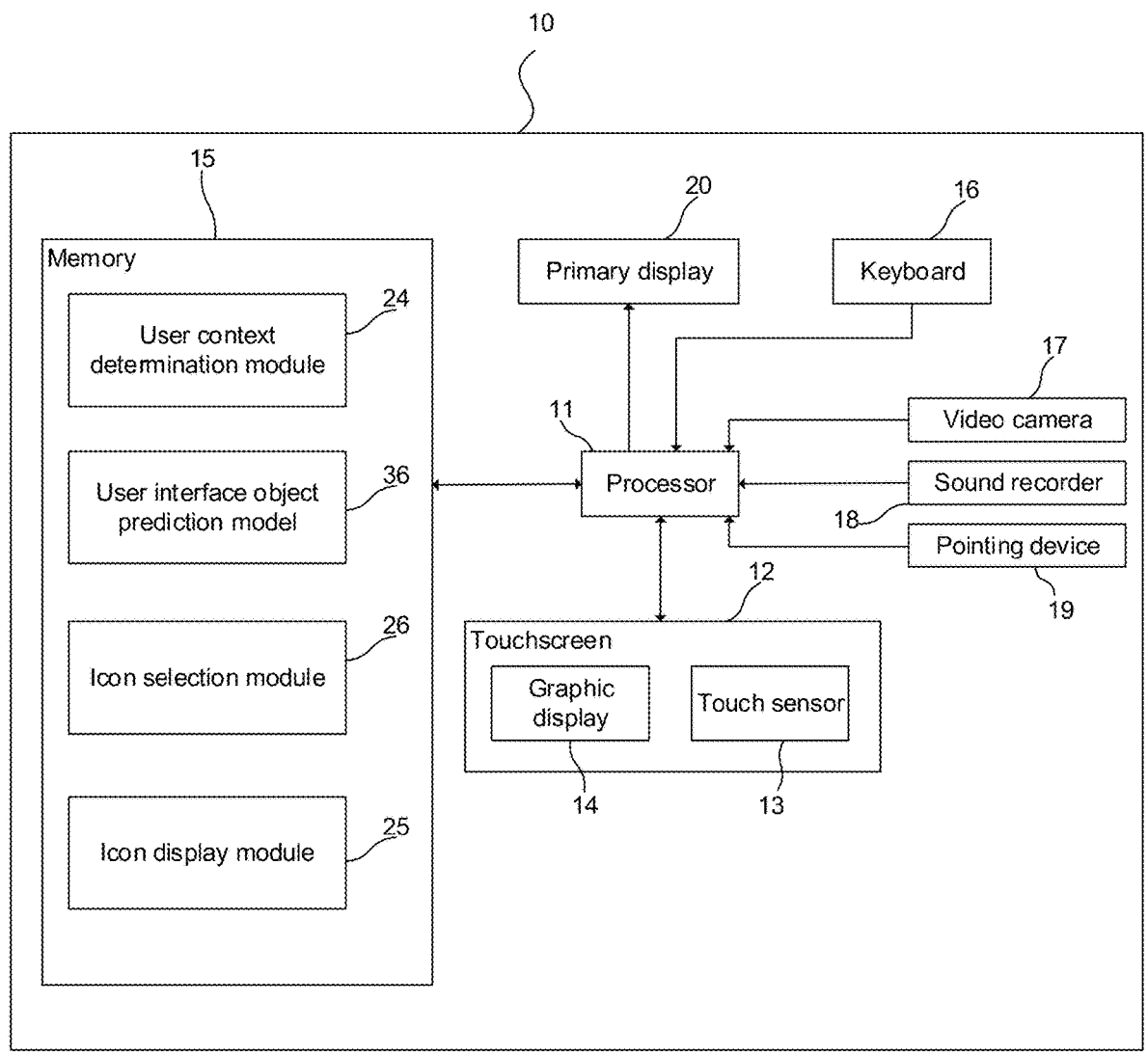
FIG. 1A illustrates a functional block diagram of a computer system in accordance with an embodiment of the invention.

In FIG. 1A, reference numeral 10 refers generally to a computer system in accordance with an embodiment of the invention. The computer system 10 may be a portable computer system such as a laptop or notebook computer, tablet, a personal or desktop computer or even a mobile phone, personal digital assistant (PDA), consumer electronic device or the like. In the example embodiment illustrated in FIG. 1A, the computer system 10 may take the form of a laptop computer.

As illustrated in FIG. 1A, the computer system 10 may include a processor or central processing unit (CPU) 11 and a touchscreen 12 which is connected to the processor 11 and includes a graphical display 14, as an output device, and a touch sensor 13, as an input device. The graphical display 14 may be overlaid with the touch sensor 13, in conventional fashion. However, it is also possible that the touch sensor 13 may be separated from the graphical display 14. The touchscreen 12 therefore may have input and output capabilities and may be coupled or communicatively linked to the processor 11.

The computer system 10 may also include memory 15 communicatively coupled to the processor 11. The memory 15 may be any suitable computer readable storage medium (or media) which is configured to store program instructions. The computer system 10 may also include the following computer input devices which operatively may be connected to the processor 11 and are known in the art of laptop computers: a keyboard 16, a video camera 17, a sound recorder or microphone 18, and a pointing device or mouse 19. Furthermore, the computer system 10 may include a primary display 20 which may take the form of a Liquid Crystal Display (LCD) screen, Light Emitting Diode (LED) screen or other known displays available on the market. The processor 11 is connected to the primary display 20 in order to output graphics to the primary display 20.

During operation, the user may select and activate various user interface objects in order to initiate functions or tasks associated with the objects. The computer system 10 and associated method described below may significantly improve the efficiency and productivity of the user by presenting the user with useful shortcuts or user interface objects on the touchscreen 12, at appropriate times.

Figure 1B:
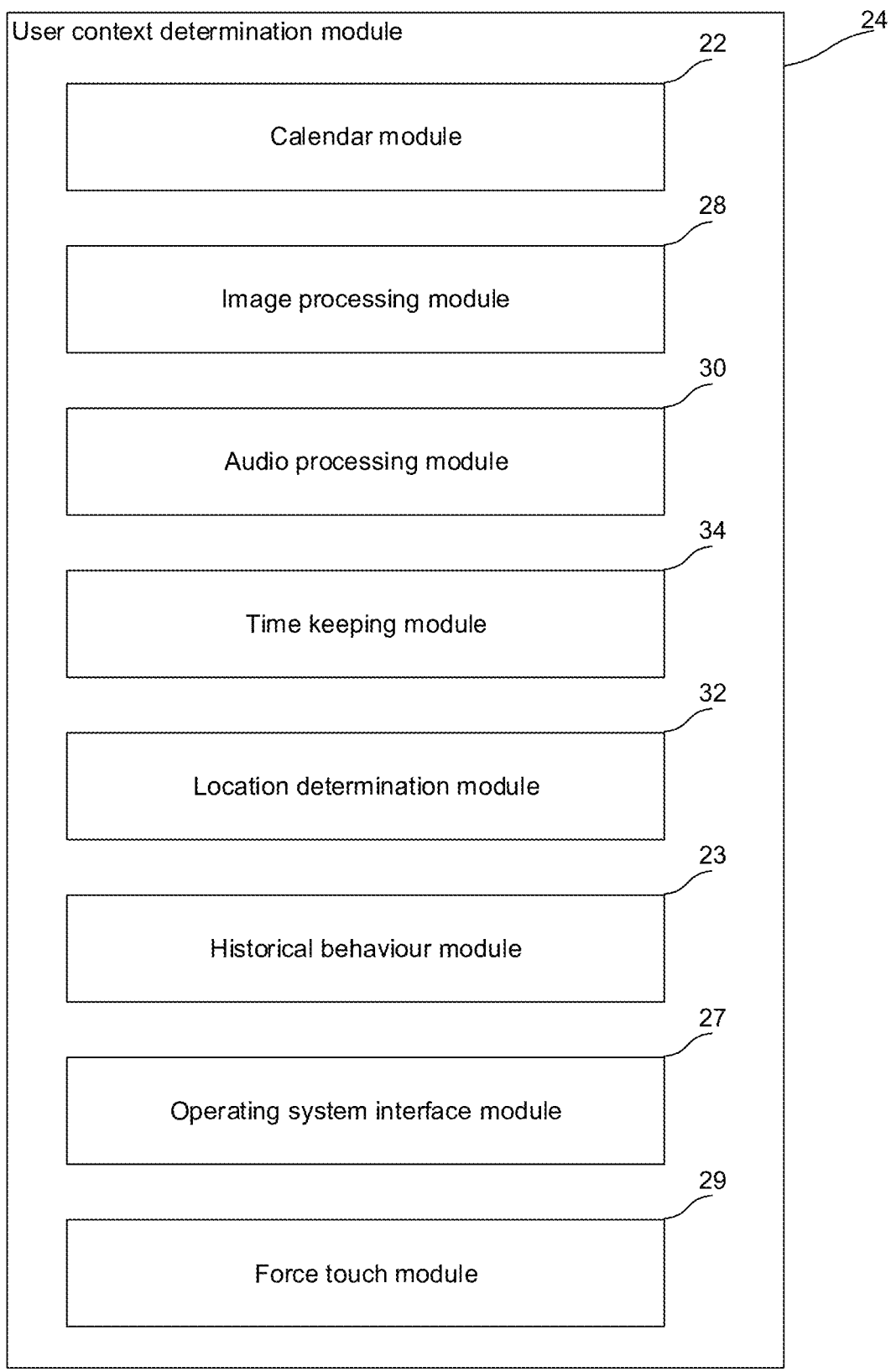
FIG. 1B illustrates part of the block diagram of FIG. 1A in more detail.

The computer system 10 may include the following core or primary modules stored in the memory 15 which will be discussed in more detail below: a user context determination module 24, a user interface object prediction model 36, an icon selection module 26, and an icon display module 25. As illustrated in FIG. 1B, the user context determination module 24 may include the following submodules: a calendar module 22, an image processing module 28, an audio processing module 30, a location determination module 32, a time keeping module 34, a historical behavior module 23, an operating system interface module 27 and a force touch module 29.

Figure 2:
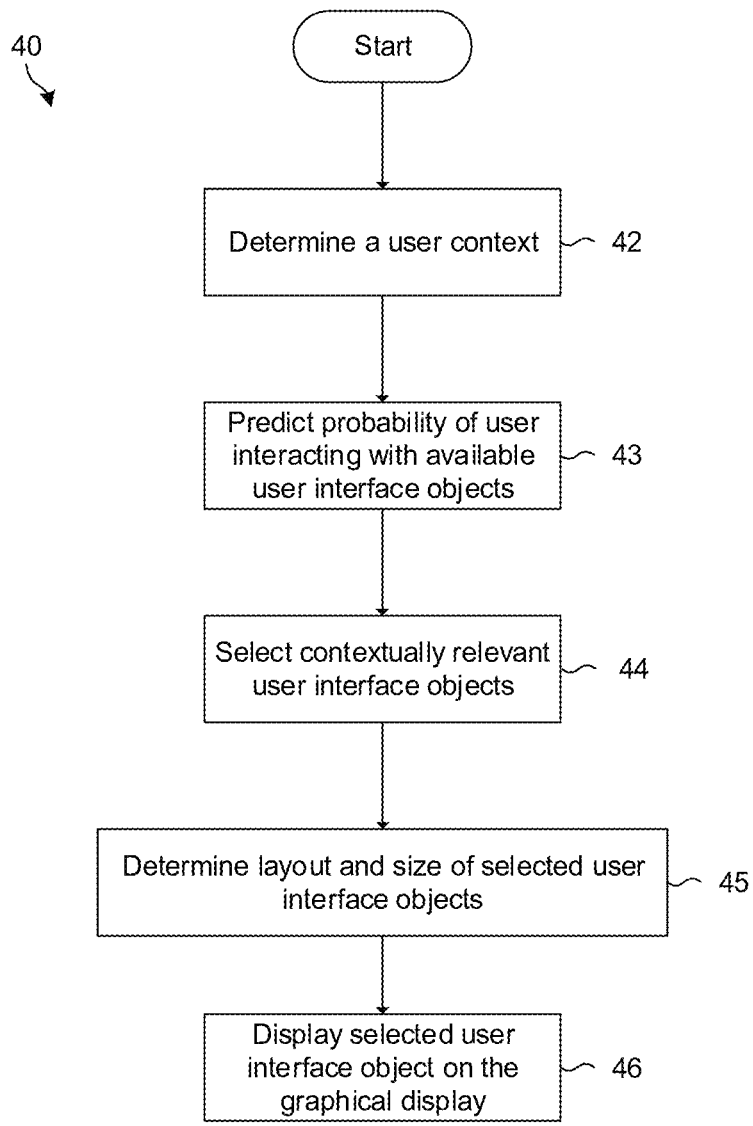
FIG. 2 illustrates a flow diagram of a method of controlling the computer system, in accordance with an embodiment of the invention.

Reference is now made to FIGS. 2 to 6 which illustrate various aspects of a computer-implemented method of controlling the computer system 10 in accordance with an embodiment of the invention. In FIG. 2, reference numeral 40 refers generally to a method of controlling the computer system 10 in order to display contextually relevant user interface objects to a user on the graphical display 14 based upon a context of the user as determined by the user context determination module 24. In broad terms, the method 40 of controlling the computer system 10 may include determining, at block 42, the user's context using the user context determination module 24, predicting 43, using the user interface object prediction model 36, a probability of the user interacting with any one or more of a number of available user interface objects, selecting, at block 44, using the icon selection module 26, one or more contextually relevant user interface objects based upon the user's context as determined by the user context determination module 24, determining, at block 45, a layout and size of selected user interface objects using the icon display module 25 and displaying, at block 46, the contextually relevant user interface objects on the graphical display 14 of the touchscreen 12.

User interface objects are graphical images displayed as part of a graphical user interface on the graphical display 14 or primary display 20 and may be represented as shortcuts, windows, fields, dialog boxes, menus, icons, virtual buttons, keys, cursors or scroll bars etc.

The method may include extracting user interface objects from a graphical user interface of an application currently running on the computer system 10. For example, shortcuts such as "Bold", "Left Align", "Font Size", and "Font Color" may be captured or extracted from the graphical user interface of a word processing application.

The icon display module 25 may determine the layout and size of icons displayed on the touchscreen 12. Icons with a higher probability, as determined by the user interface object prediction model 36, may be assigned a more prominent position, and may be larger in size. Icons with a lower probability may be assigned a less prominent position, and may be smaller in size. The icon display module 25 may group together icons with similar functionality, for example, icons concerning text formatting may be grouped together.

A variety of user context determination methods are contemplated within the scope of the illustrative embodiments. The user's context may be determined by a number of factors which include the user's age, a current location of the computer system 10 as determined by the location determination module 32, a time of day as determined by the time keeping module 34, the user's behavior and mood or cognitive state of mind which may be determined by observing the user using any one or more of the various computer input devices including the video camera 17, sound recorder 18, touch sensor 13, and keyboard 16. The user's context may also be determined by having regard to the user's schedule as determined by the calendar module 22. Furthermore, it may be determined by having regard to the application that the user is currently interacting with, and the user's actual activity within the application as determined by the operating system interface module 27. For example, the user may be drawing, writing, calculating or composing music/video. User context may also be based upon previous applications that the user has recently interacted with, which may still be running in the background, or may have been closed by the user. The user context determination module 24 may also make use of sensed ambient light conditions to determine the user context.

The user context may be determined by monitoring, using the operating system interface module 27, a user's interaction or engagement with the computer system 10 based upon actions performed by the user. User interactions may include event streams such as user's typing, scrolling, clicking, etc. The user interactions with the current application may be used to determine the current user activity (e.g. reading, writing, drawing, calculating, music/video composing etcetera).

Figure 3A:
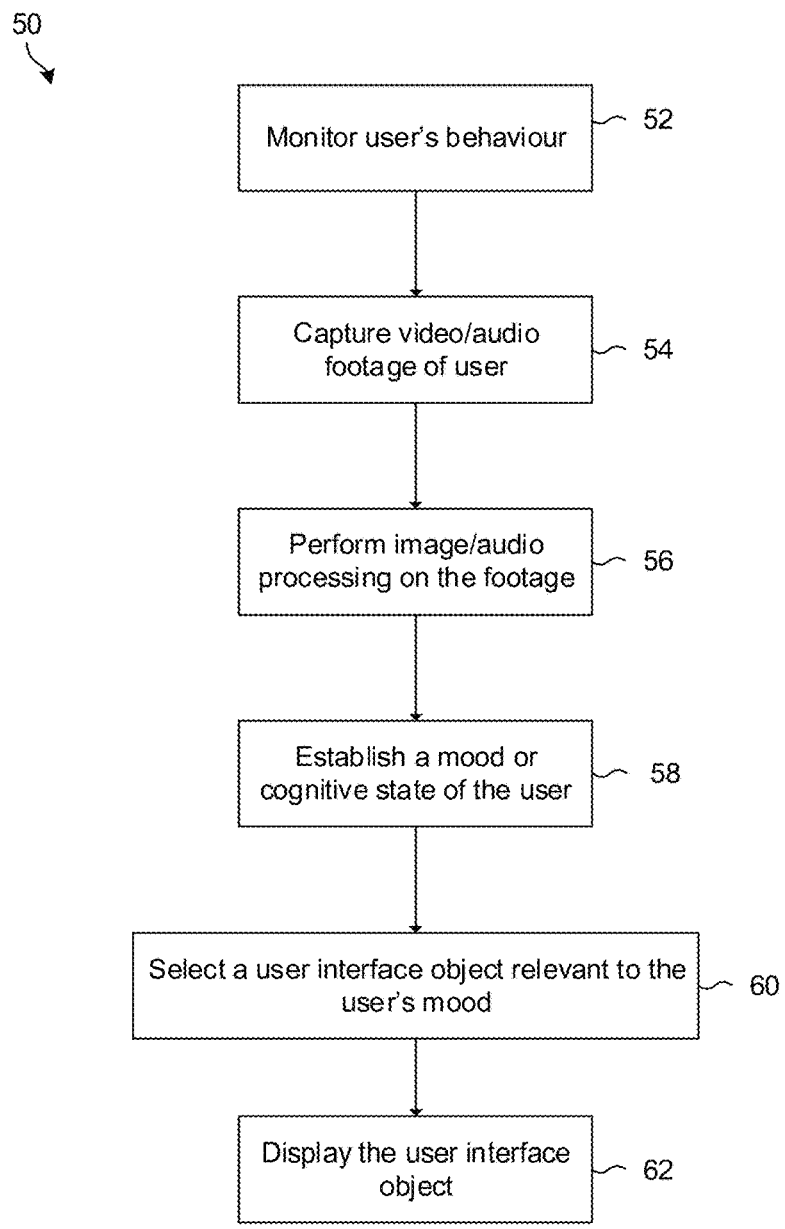
FIG. 3A illustrates a flow diagram for establishing a user's cognitive state.
Figure 3B:
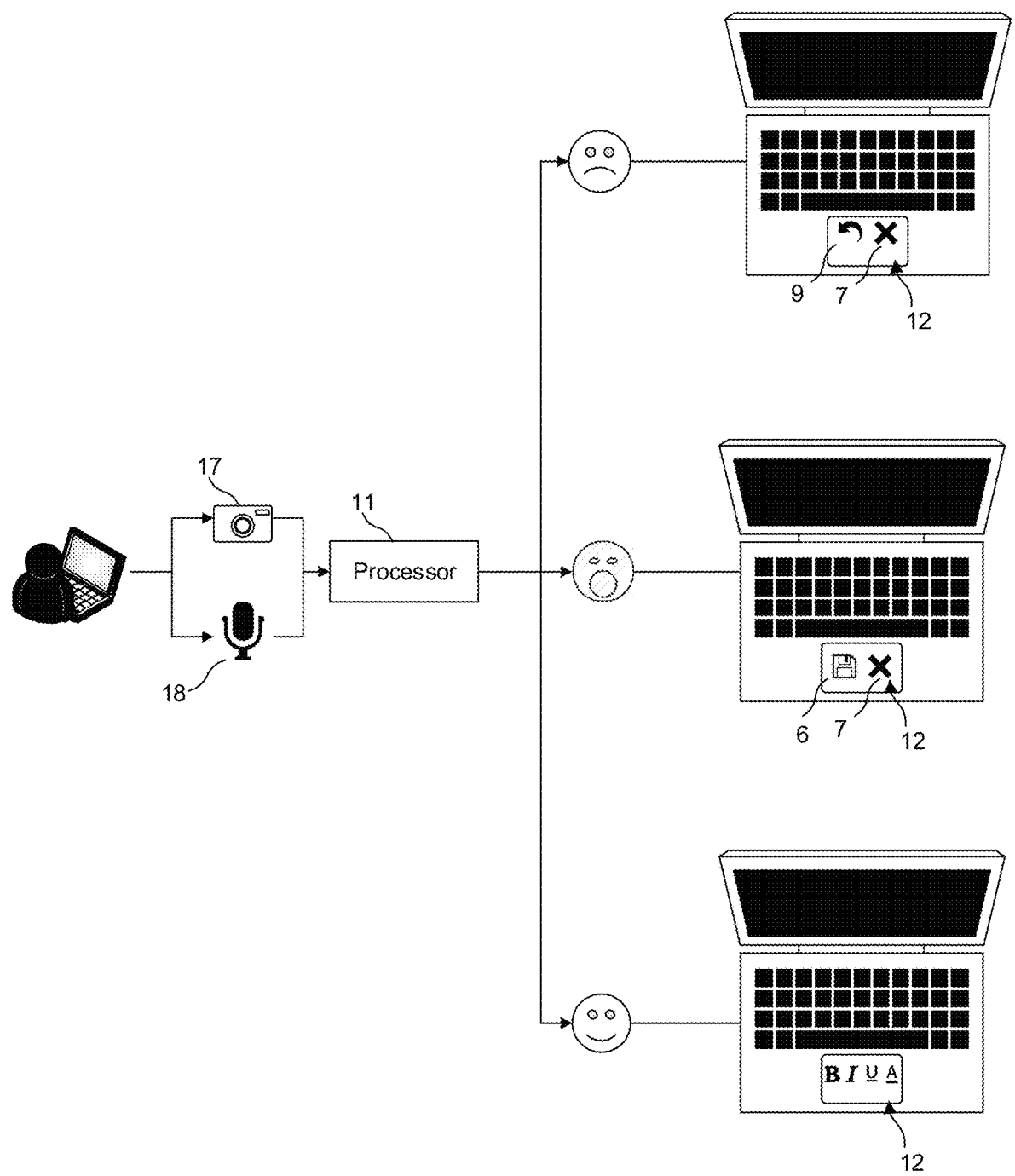
FIG. 3B shows a diagrammatic representation of the flow diagram of FIG. 3A.

FIGS. 3A and 3B illustrate a more detailed method 50 of controlling the computer system 10 in order to display contextually relevant user interface objects on the touchscreen 12. For example, the method 50 may include monitoring, at block 52, the user's behavior using the video camera 17 and/or sound recorder 18 by capturing, at block 54, video/audio footage of the user. Once the footage has been captured it is forwarded to the processor 11 where image and/or audio processing is performed, at block 56, by the image/audio processing modules 28, 30.

The method 50 may further include establishing a mood or cognitive state of the user, at block 58, based on the outcome of the image/audio processing. For example, if the user makes a loud utterance or frowns, the computer system 10 may establish that the user is frustrated with a present application and select, at block 60, using the icon selection module 26, and display, at block 62, an "Undo" shortcut 9 or "Exit" icon 7 on the graphical display 14 based on the user's cognitive state. Similarly, a "Save" icon 6 may be displayed if the image processing module 28 establishes that the user is drowsy. Alternatively, if the image processing module 28 establishes that the user is happy, icons pertaining to the user's current activity may be displayed, for example, editing a word document.

Furthermore, based on the user's age, which may be determined by the user context determination module 24 or which may be saved under a user profile upon creation of the profile or otherwise derived, the computer system 10 may be configured to select, using the icon selection module 26, an age-appropriate icon or user interface object to display on the graphical display 14. For example, an "Email" shortcut may be presented if the user is an adult and a "Games" shortcut may be presented or displayed if the user is a minor.

Also, user context may be location-based. In other words, based upon a present location of the computer system 10 as determined by the location determination module 32, one or more user interface objects frequently used at the determined location or otherwise connected to the location may be displayed on the graphical display 14. For example, if the user is at work, the "Email" icon may be displayed but if the user is at home, an internet browser shortcut or other entertainment-related shortcut may be displayed.

Similarly, user context may be determined by the user context determination module 24 based upon a time of day, as communicated by the time keeping module 34. Accordingly, the method may include selecting 44, using the icon selection module 26, contextually relevant shortcuts to display. For example, in the morning, a work-related application shortcut may be displayed on the graphical display 14 and in the evening a shortcut related to leisure may be displayed.

User context may also be determined by the user context determination module 24 having regard to scheduling of the calendar module 22. For example, if the user has a meeting scheduled in his calendar and is currently busy with leisure such as watching a movie, the icon display module 25 may offer a "Fast Forward" or "Pause" icon on the graphical display 14. The selection 44 of relevant user interface objects by the icon selection module 26, to display on the graphical display 14 may depend upon calendar events. In other words, a calendar event reminder may be displayed on the display 14.

In addition, user context may be determined by having regard to ambient light intensity as sensed by the video camera 17 or by a separate dedicated ambient light sensor of the computer system 10. Accordingly, the icon selection module 26 may select to display an icon or scroll bar to adjust the brightness of the primary display 20 in the event that a current screen brightness is not suitable for the sensed ambient light intensity.

Figure 4:
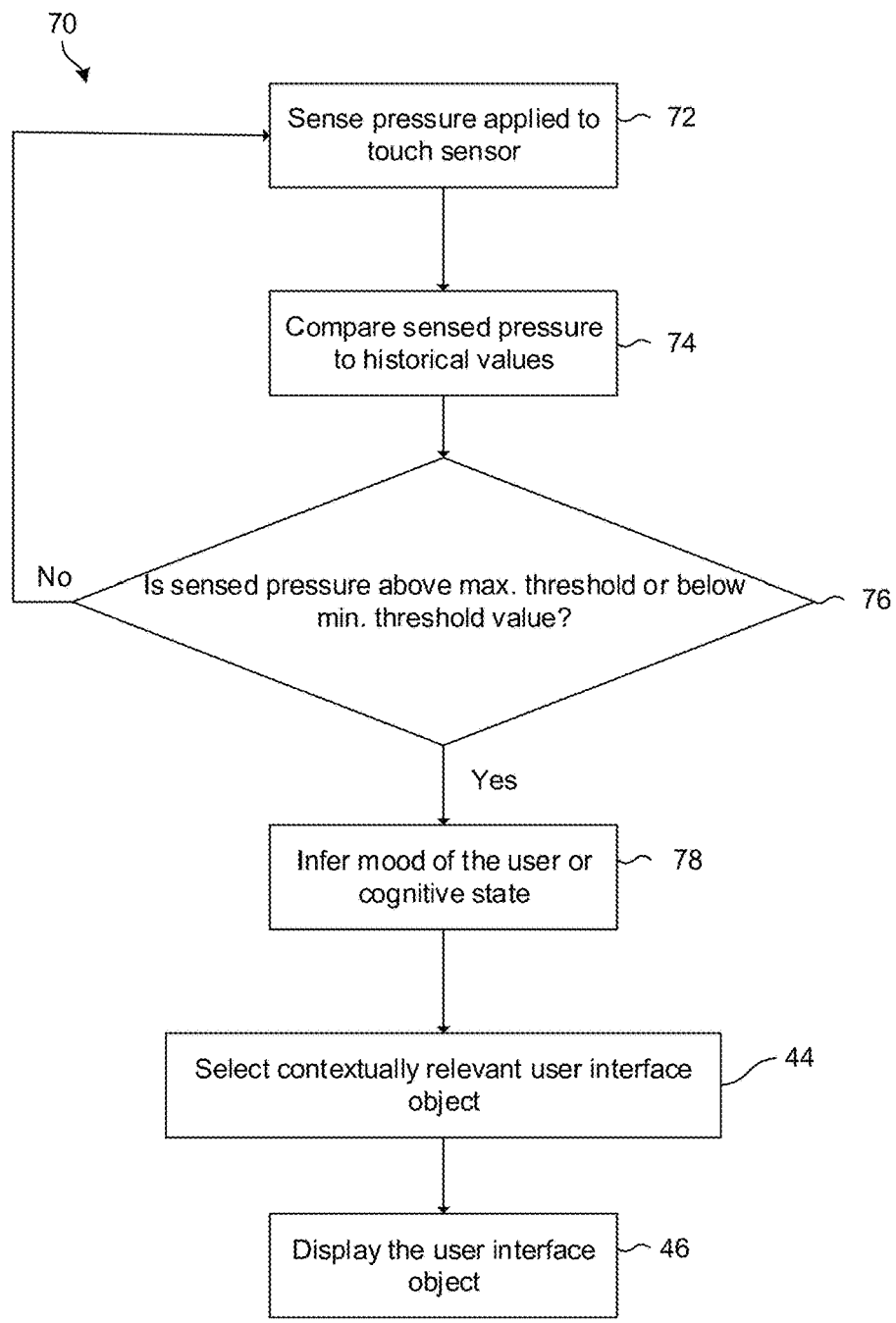
FIGS. 4 to 6 illustrate flow diagrams of detailed aspects of the method of FIG. 2.

FIG. 4 illustrates a method 70 for determining user context, and specifically a user's mood or cognitive state based upon pressure sensed by the touch sensor 13. At block 72, the touch sensor 13 senses pressure applied by the user during use of the touchscreen 12. The sensed force or pressure applied may be compared, at block 74, to the user's historic interaction with the touchscreen in order to ascertain, at block 76, whether or not the sensed pressure exceeds a predetermined threshold. Prior calibration may also be performed to identify a predetermined threshold or specify interactions with the touch sensor 13. If the pressure applied exceeds a maximum threshold or is below a minimum threshold inferences, block 78, may be made with regards to the user's present mood or cognitive state. As before, appropriate user interface objects may be selected, 44, and displayed, 46, based upon the inferences. For example, a light touch could indicate that the user is tired and a "Shutdown" icon may be displayed. Alternatively, a hard touch may indicate frustration and an "Exit" shortcut may be displayed.

Figure 5:
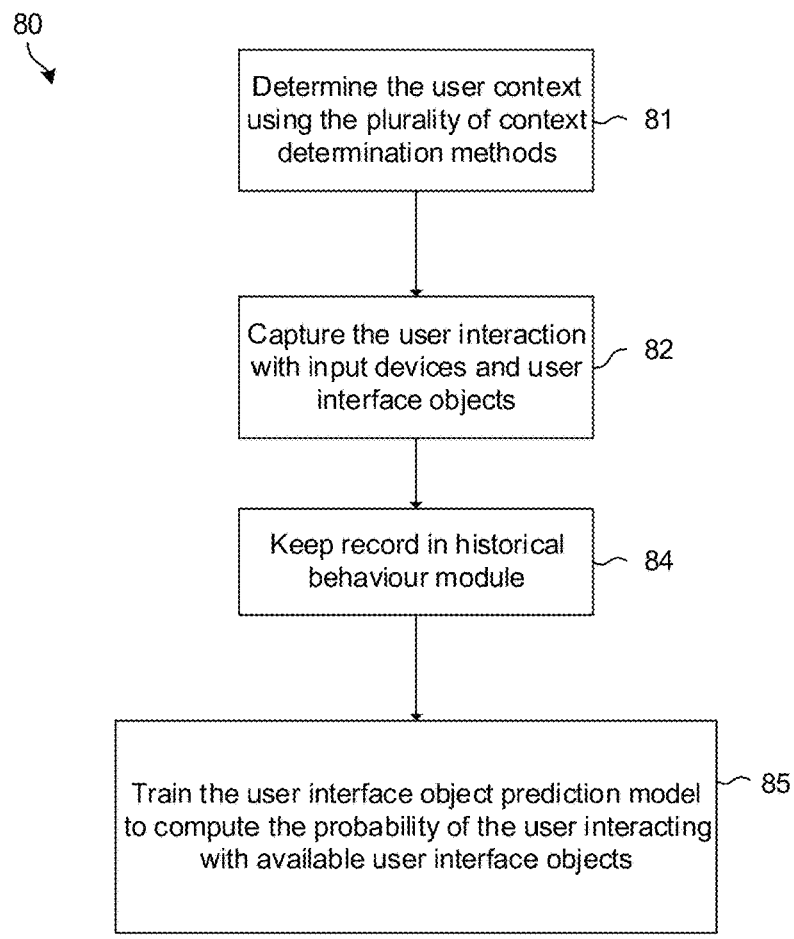

FIG. 5 elaborates and provides more detail with regards to the method illustrated in FIG. 2 and illustrates further steps 80 for determining a user's context and selecting contextually relevant user interface objects which includes determining, at block 81, the user context using the plurality of context determination methods, capturing, at block 82, user interaction using any of the user input devices 16, 19, 13 as well as keeping record 84, using the historical behavior module 23, of user interaction with various user interface objects such as icons and shortcuts displayed on the displays 14, 20. The method further includes training the user interface object prediction model 36 to compute the probability of the user interacting with available user interface objects. Training includes capturing or monitoring shortcuts selected by the user in different scenarios. The user may choose shortcuts by clicking with the pointing device 19, or using the keyboard 16 to enter a shortcut. The computer system 10 then uses an advanced machine learning algorithm to build the user interface object prediction model 36 which assigns a probability to each shortcut, given a particular set of inputs. The method may include ranking these shortcuts from highest probability to lowest probability.

The user interface object prediction model 36 may be dynamic and change as the user interacts with the computer system 10. For example, if an icon is displayed on the touchscreen, but the user doesn't make use of it, then its probability decreases, and it is eventually removed from the graphical display of the touchscreen. If an icon is frequently used, then its probability increases, and consequently the icon may be assigned a more prominent position on the graphical display, and larger size. In another example of dynamic learning, the model 36 may identify a specific sequence of use of icons by a particular user, such as repeated use of "Save", "Close" and "Shutdown" icons in quick succession. Based upon this evaluation, the model 36 may be configured to present the "Close" icon to the user upon the user selecting the "Save" icon in anticipation of the user's next engagement with the graphical user interface. Similarly, upon the user selecting the "Close" icon, the "Shutdown" icon may be displayed automatically on the graphical display 14. Alternatively the method may display a single icon which combines the commands "Save", "Close", and "Shutdown".

Figure 6:
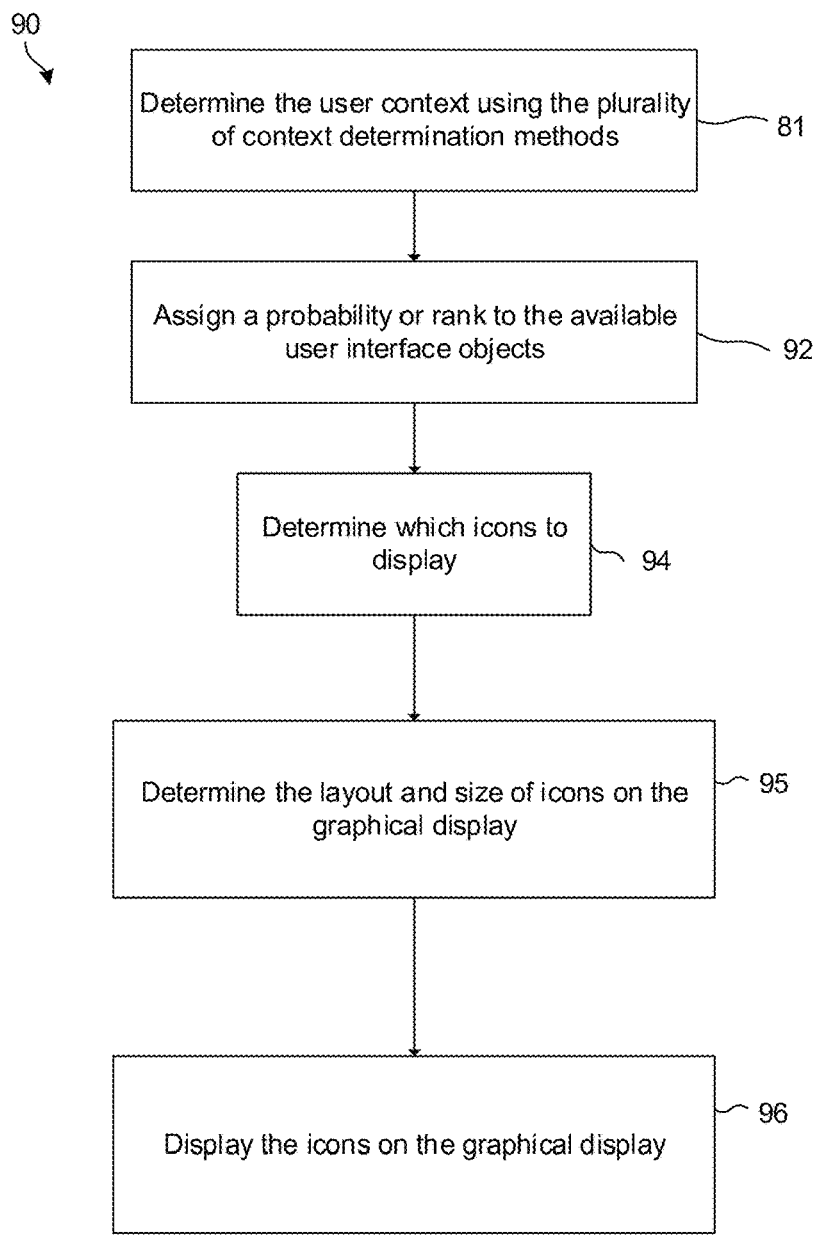

Accordingly, regard may be had to an icon's ranking or probability when selecting 44 contextually relevant user interface objects to display. Further method steps 90 are illustrated in FIG. 6 illustrative of use of the user interface object prediction model 36. These steps 90 include determining the user context 81 using the plurality of context determination methods and assigning 92, using the user interface object prediction model 36, a probability or rank to the available user interface objects and determining 94, using the icon selection module 26, which icons to display. The method further includes determining, at block 95, using the icon display module 25, the layout and size of icons to display on the graphical display and displaying 96 the icons on the graphical display. The method involves choosing several icons or shortcuts with the highest probability to display on the touchscreen.

Furthermore, user profiling may be performed, by associating the user interface object prediction model 36 with a particular user. The user interface object prediction model 36 may be uploaded to a server in the cloud, whereby user interface object prediction models from different users may be aggregated together for a combined model.

In a further embodiment, the touchscreen may have three different operating modes namely static, cognitive and user-defined modes. In static mode, the touchscreen displays a predetermined list of shortcuts for a particular application, i.e. application-driven display of user interface objects. For example, when the user is browsing the internet, the touchscreen may display the shortcuts for "Forward", "Backward", and "Refresh". In static mode, the touchscreen may always display the same shortcuts for a particular application. Static mode may allow designers of software applications to determine which shortcuts they deem most useful for their applications. In contrast, in cognitive mode, the user interface object prediction model 36 will determine which shortcuts to display. The shortcuts for a particular application may change depending on the user's context, behavior, or cognitive state. In user-defined mode, the user is able to define rules for display.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create module for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process (or method), such that the instructions which execute on the computer, other programmable apparatus, or other device implement the functions/acts specified in the flowchart and/or block diagram block or blocks.

The flowchart and block diagrams in the FIGS illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of controlling a computer system which includes a processor and a touchscreen, the touchscreen including a graphical display and a touch sensor, the method including:
   determining, by way of a user context determination module, a user context of at least one user of the computer system;
   predicting, based on the user context, a probability of the user interacting with one or more user interface objects in relation to an application running on the computer system, the probability changing dynamically at least based on frequency of use of the one or more user interface objects;
   based on the predicting, selecting, using an icon selection module, one or more user interface objects which are contextually relevant to the determined context of the user; and
   displaying, using the graphical display of the touchscreen, the one or more user interface objects selected by the icon selection module,
   wherein the one or more user interface objects, which are displayed, change dynamically based on the application running on the computer system and the user context,
   wherein a position and size of the one or more user interface objects change dynamically based on the probability.

2. A method as claimed in claim 1, wherein determining the user context includes monitoring behavior of the user by way of at least one input device of the computer system.

3. A method as claimed in claim 2, which includes capturing, using a video camera coupled to the processor of the computer system, video footage of the user and establishing a mood or cognitive state of the user by way of an image processing module based on the video footage.

4. A method as claimed in claim 2, which includes capturing, using a sound recorder coupled to the processor, audio footage of the user and establishing a mood or cognitive state of the user by way of an audio processing module based on the audio footage.

5. A method as claimed in claim 2, which includes sensing, using the touch sensor of the touchscreen, pressure applied to the touchscreen by the user in order to infer a mood or cognitive state of the user, and selecting, using the icon selection module, one or more user interface objects to display on the graphical display of the touchscreen based upon the mood or cognitive state of the user.

6. A method as claimed in claim 2, wherein monitoring behavior of the user includes: capturing user interaction with the computer system using any one or more
    computer input devices selected from: the touch sensor, a keyboard, a pointing device, video camera and sound recorder.

7. A method as claimed in claim 6, which includes:
evaluating, using the user context determination module, the captured user interaction by identifying a sequence of interactions the user has with the computer system;
developing a user interface object prediction model based upon the sequence of interactions; and
predictively displaying, on the graphical display of the touchscreen, user interface objects based upon the user interface object prediction model.

8. A method as claimed in claim 1, which includes associating at least one user interface object with an age of the user and wherein determining the user context includes determining an age of the user.

9. A method as claimed in claim 1, which includes keeping record, using the user context determination module, of the user's interaction with respective user interface objects and
ranking, using a user interface object prediction model, the user interface objects based upon their frequency of use by the user.

10. A method as claimed in claim 6, which includes associating, using the user interface object prediction model, a group of user interface objects with a particular user based upon that user's interaction with the group of user interface objects.

11. A method as claimed in claim 1, wherein determining the user context includes establishing, using a location determination module, a location of the computer system and selecting, using the icon selection module, one or more user interface objects to display based upon the established location of the computer system.

12. A method as claimed in claim 1, wherein determining the user context includes establishing, using a time keeping module, a time of day and selecting, using the icon selection module, one or more user interface objects to display based upon the time of day.

13. A method as claimed in claim 1, wherein determining the user context includes sensing ambient light intensity and displaying, on the graphical display of the touchscreen, a user interface object which can be manipulated in order to adjust a screen brightness.

14. A method as claimed in claim 1, wherein determining the user context includes monitoring, using a calendar module of the computer system, a schedule of the user and displaying a contextually relevant user interface object on the graphical display of the touchscreen related to a scheduled calendar event.

15. A method as claimed in claim 1, wherein selecting one or more user interface objects includes extracting, using the icon selection module, one or more user interface objects from a graphical user interface represented on a primary display of the computer system and displaying the extracted user interface objects on the graphical display of the touchscreen.

16. A method as claimed in claim 1, wherein selecting includes defining user specified rules for display of user interface objects on the graphical display of the touchscreen.

17. A computer system for controlling a touchscreen which includes a graphical display and a touch sensor, the computer system including:
a processor;
the touchscreen, coupled to the processor; and
a computer readable storage medium having stored thereon program instructions executable by the processor to direct the computer system to:
determine a user context by way of a user context determination module;
predict, based on the user context, which one or more user interface objects the user is likely to interact a probability of the user interacting with one or more user interface objects in relation to an application currently running on the computer system, the probability changing dynamically at least based on frequency of use of the one or more user interface objects;
based on the predicting, select, using an icon selection module, one or more user interface objects which are contextually relevant to the context of the user; and
display the one or more user interface objects selected by the icon selection module using the graphical display of the touchscreen,
wherein the one or more user interface objects, which are displayed, change dynamically based on the application running on the computer system and the user context,
wherein a position and size of the one or more user interface objects change dynamically based on the probability.

18. A computer system as claimed in claim 17, wherein the program instructions executable by the processor direct the computer system to monitor behavior of the user by way of at least one input device of the computer system.

19. A computer system as claimed in claim 18, wherein the input device is a video camera which is communicatively coupled to the processor.

20. A computer program product for controlling a computer system which includes a processor and a touchscreen which includes a graphical display and a touch sensor, the computer program product comprising a computer-readable medium having program instructions stored thereon which are executable by the processor of the computer system to enable the processor to:
determine a user context by way of a user context determination module;
predict, based on the user context, a probability of the user interacting with one or more user interface objects in relation to an application running on the computer system, the probability changing dynamically at least based on frequency of use of the one or more user interface objects;
based on the predicting, select, using an icon selection module, one or more user interface objects which are contextually relevant to the user context; and
display the one or more selected user interface objects on the graphical display of the touchscreen,
wherein the one or more user interface objects, which are displayed, change dynamically based on the application running on the computer system and the user context, wherein a position and size of the one or more user interface objects change dynamically based on the probability.

* * * * *